March 9, 1937.                P. A. KINZIE                2,073,481
                               SPHERE VALVE
                           Filed May 28, 1934           5 Sheets-Sheet 1

INVENTOR:
Phillip A. Kinzie,
BY Potter, Pierce & Scheffler,
                     ATTORNEYS.

March 9, 1937.  P. A. KINZIE  2,073,481
SPHERE VALVE
Filed May 28, 1934   5 Sheets-Sheet 2

INVENTOR:
Phillip A. Kinzie,
BY Potter, Pierce & Scheffer
ATTORNEYS.

March 9, 1937.  P. A. KINZIE  2,073,481
SPHERE VALVE
Filed May 28, 1934   5 Sheets-Sheet 3

INVENTOR:
Phillip A. Kinzie,
BY Potter, Pierce & Scheffler,
ATTORNEYS.

March 9, 1937. P. A. KINZIE 2,073,481
SPHERE VALVE
Filed May 28, 1934 5 Sheets-Sheet 4

INVENTOR:
Phillip A. Kinzie,
BY Potter, Pierce & Scheffler
ATTORNEYS.

Patented Mar. 9, 1937

2,073,481

UNITED STATES PATENT OFFICE 2,073,481

SPHERE VALVE

Phillip A. Kinzie, Denver, Colo., assignor to Universal Hydraulic Corporation, Denver, Colo., a corporation of Colorado Application May 28, 1934, Serial No. 728,039

7 Claims. (Cl. 137—139)

This invention relates to valves adapted to be operated by fluid pressure taken from the controlled conduit, and particularly to "spherevalves" which include a rotatable valve element of substantially spherical shape and having a cylindrical passage therethrough for alinement with the inlet and outlet passages of the valve body when the valve is in fully open position.

The invention is to be distinguished from the small check valves or manually operated valves employing a globular or ball element which is bodily displaced towards and away from a valve seat. Although the invention is not restricted to valves of any particular size, it is particularly useful in the construction of valves for controlling fluid flow in conduits having a diameter of the order of upward of one foot. Spherevalves have been previously proposed but have not been practical, due primarily to the fact that none of the proposed designs solved the problem of making the valves tight when adjusted to closed position. Many complicated and in some cases ingenious devices have been produced in repeated and earnest efforts to overcome this one objection, and in each instance they have met with but partial success.

It was largely due to this difficulty in obtaining a tight valve without an excessive amount of supplemental packing equipment, coupled with the difficulties experienced in performing the machine work upon this type of construction, which has heretofore held back any very extensive use of such valves.

In the valve embodying my invention, this difficulty of obtaining fluid tight closure has been overcome by a surprisingly simple means, as have also the machining troubles formerly prevalent, as will be made plain as this description proceeds.

An object is to provide a rotatable valve which may be constructed economically and which will be satisfactory in operation. An object is to provide a spherevalve having sealing mechanism which is normally withdrawn or inoperative, and which may be moved into operative position after the valve element has come to rest in its fully closed position. An object is to provide a valve including a rotatable valve element wherein all of the essential parts, other than the control mechanism, are symmetrical with respect to the axial center line of fluid flow through the valve and adjacent conduit sections, and with respect to the axis of rotation, which latter axis is normal to and intersects the axial center line of fluid flow, thus providing a hydraulic balance of the valve element with reference to force impressed thereon. A further object is to provide a balanced rotatable valve including two complete hydraulic motors symmetrically positioned with reference to the center line of fluid flow, thus avoiding the necessity of any elements, such as diaphragms and stuffing boxes, for preventing unbalanced hydraulic thrusts of high magnitude from forcing the rotatable element axially out of alinement with the fluid passage. A further object is to provide a valve of the type last stated which substantially eliminates all stems for transmitting turning forces from the hydraulic motors to the rotatable valve element, the contemplated construction including hydraulic torsion motors at opposite ends of and comprised in part by the rotatable element itself.

An object is to provide a valve including balanced hydraulic torsion motors at opposite sides of a rotatable valve element, and in which all operating fluid passageways for the motors may be located within the valve body and, in general, within the rotatable valve element. A particular object of the invention is to provide a valve including sealing means which may be retracted into the rotatable valve element or, alternatively, projected into sealing engagement with appropriate seats on the valve body or casing prior to any rotational movement of the valve element. Other objects relate to the design and construction of the parts of a spherevalve which facilitate the construction, assembly and operation of the valve.

These and other objects of the invention will be apparent from the following specification when taken with the accompanying drawings in which.

The several drawings and figures that are embodied within this present application are taken directly from the detail designs and drawings developed for a 30″ spherevalve capable of functioning under a working pressure of 300 pounds per square inch. After completing these designs, an investigation was made to determine the relative weights and dimensions of such commercially obtainable valves as would most nearly meet all the working conditions which this valve must withstand and it was found that the so-called ring follower type valve with certain essential modifications could be employed here, but that it would be approximately 16 feet 10 inches in over-all height, by 5 feet 1 inch long, face to face of conduit flanges, and that its weight would be approximately 28,000 pounds.

Valves of the conical plug type were then investigated and two commercial makes were found which, with certain essential modifications, might meet the requirements and their respective dimensions and weights were found to be as follows: overall heights 10 feet 6 inches and 7 feet 11 inches, overall lengths flange face to flange face 5 feet 4 inches and 5 feet 2 inches, and their approximate weights 25,400 pounds and 23,500 pounds, respectively.

The valve illustrated in this present application is 5 feet 10 inches in overall height by 4 feet 0 inches long, face to face of flanges and weighs 11,200 pounds. It can be further stated that this valve was so designed that the stresses are lower in all of the principal parts than are those in the alternate types given above, and in consequence an even greater saving in weight would easily be possible for the valve of my invention.

When the comparisons with the other valves listed above were being made, it was found that the turning torques required for operating both conical plug types of valves are of higher values than those which will successfully operate the same size spherevalve, and the fact was also established that these conical valves were provided with turning mechanisms which would develop approximately one third of the turning torque provided in the valve described herein.

A spherevalve or valves embodying the invention can be used as a means whereby the flow of water or other liquid in a conduit or pipe line is regulated and wherein the rotating element is actuated by the pressure of the water within the conduit. Such a spherevalve might, for example, be used in a city water main, at the end of an outlet conduit through a dam, in high pressure lines carrying oil, in steam lines from boilers, and in lines carrying tar, asphaltum base compounds and other viscous fluids, in each case for stopping or controlling the rate of flow through the conduit or pipe as desired.

Valves of this invention are contemplated for use from relatively small sizes up to those of the very largest sizes employed for handling water under pressure, in which last use it is most particularly well adapted for many reasons of which a few more specific examples will now be given.

In major hydro-electric plants where hydraulic turbines developing up to 115,000 or more horsepower each are employed, it has been found that the presence of needle or butterfly valves in the penstocks adjacent to the turbines sets up eddies and disturbances in the water flowing through them and that this disturbance continues on downstream in the penstocks for some distance, thus making it necessary to provide a horizontal distance of approximately three penstock diameters or preferably more between the valves and the turbine scroll case entrances so that these disturbances will have a chance to "iron out" and die away to permit nearly even, uniform stream flow to be established prior to entering the turbines. Unless this is done, the efficiencies of the turbines will be materially lessened, and their power output so reduced will in consequence be reflected by materially reduced power revenue represented by a loss of many thousands of dollars each year. In such turbines supplied by penstocks ranging from 12 feet to 20 feet or more in diameter, this means that the valves must be set upstream from 30 to 60 feet further than they otherwise would be, and this usually entails making the power house building that much wider in order that these valves may be housed and protected and served by the heavy cranes which they require. In large power plants having a number of power units, this increased building width with its attendant costs for added excavation, concrete and other materials will usually increase the total power installation costs by many hundreds of thousands of dollars.

With the valve of this invention, these objectionable features and added costs are eliminated, for it creates no disturbance in the penstock flow and in consequence it can be installed directly at the turbine scroll case entrance allowing the building widths to be reduced and, as there is no impediment to the free flow through this valve, there is no loss of head involved and in consequence the turbines will actually carry a larger generator output than will those employing needle or butterfly valves in the wider and more costly power plant installations. In its final result, the use of spherevalves permits the power plant to be moved upstream from 20 to 60 feet or more, as well as reducing the building width.

While the above specific applications and uses of my invention have been given, it will be obvious to those skilled in the art that these are given for the purpose of illustration and that there are many other applications to which the invention is well adapted.

In the specification and claims, such terms as "upper", "lower" and other indications of relative position are used on the assumption that the valve is positioned, as illustrated in the drawings, for rotation of the valve element on a vertical axis and with the control mechanism at the upper surface of the valve body, but it is to be understood that these terms are used merely for convenience of description since the balanced construction of the rotatable element eliminates all restrictions as to the mounting of the valve in a conduit.

In the drawings, the reference numeral 1 identifies the spherical valve element or globe which has its upper or north polar region cut away to form a horizontal plane 2, Figs. 1, 3, 4 and 8, from the central portion of which a trunnion 3 extends vertically upwards in concentric alinement with the vertical axis of the sphere. Equidistant below the center of the sphere in its lower south polar region a similar cut-away area forms a second horizontal plane 4 parallel to and vertically alined with 2 and in symmetry therewith. From the central portion of this downwardly facing plane 4 a second trunnion 5 extends downwards concentrically with the vertical axis of the sphere 1 and in symmetry with the upper trunnion 3. Midway between the upper plane 2 and the lower plane 4 and consequently concentric with the center of the sphere 1, a horizontal cylindrical water passageway is defined by the internal wall of the tubular member 6 whose extremities merge with and become a part of the exterior spherical surface of 1.

A valve body or casing is formed by two mating, complementary and essentially symmetrical halves 7 and 8 which meet and are united in a vertical plane normal to the path of fluid flow through the valve and coincident with the vertical axis of the sphere 1 by the bolts 9 which hold the opposing and cooperating valve body flanges 10 and 11 in fluid tight engagement. The central portion of the valve casing is concentrically formed around and encloses the spherical valve element 1, and vertically disposed cylindrical portions 12 and 13, concentric with the vertical axis of 1, are lined with cylindrical bushings 12A and 13A of non-corrodible metal, and terminate at equal distances above and below the center of the valve 1 in the horizontal flanges 14 and 15 to which the upper domed head 16 and the lower domed head 17 are held in fluid tight engagement by the studs 18.

Figure 1:
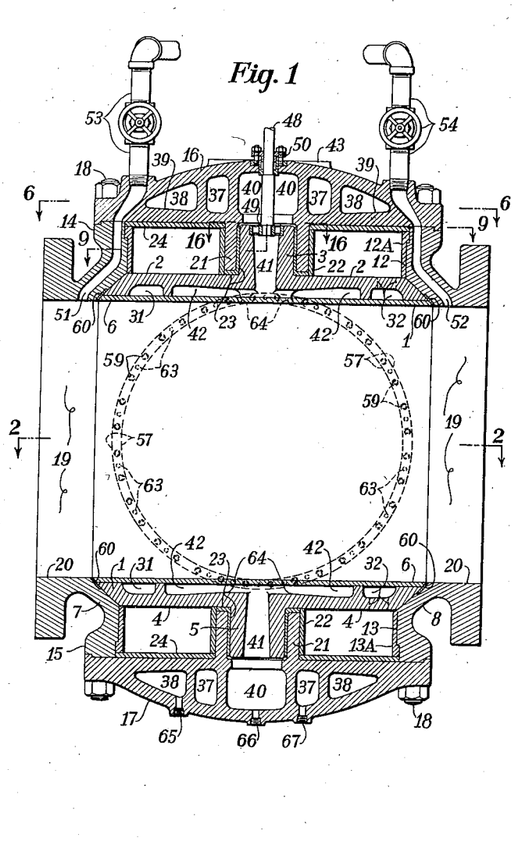
Fig. 1 is a vertical longitudinal section through a valve constituting one embodiment of the invention, the section being taken upon the centerline of flow with the valve element in the wide open position.
Figure 2:
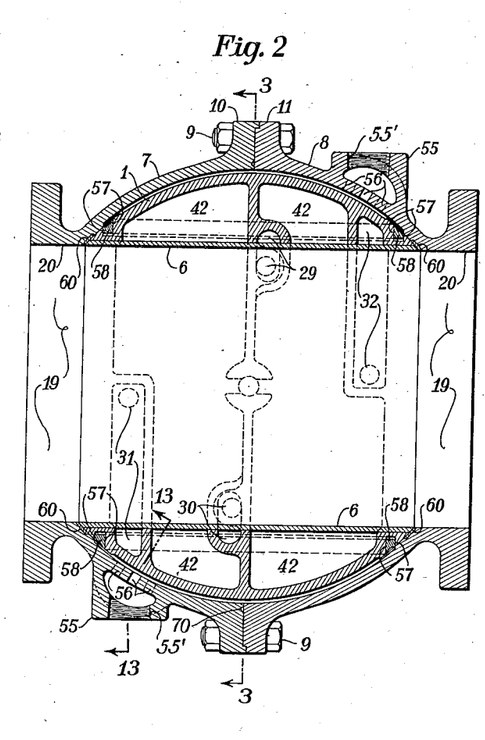
Fig. 2 is a horizontal longitudinal section through the valve taken upon the line 2—2 of Fig. 1.
Figure 3:
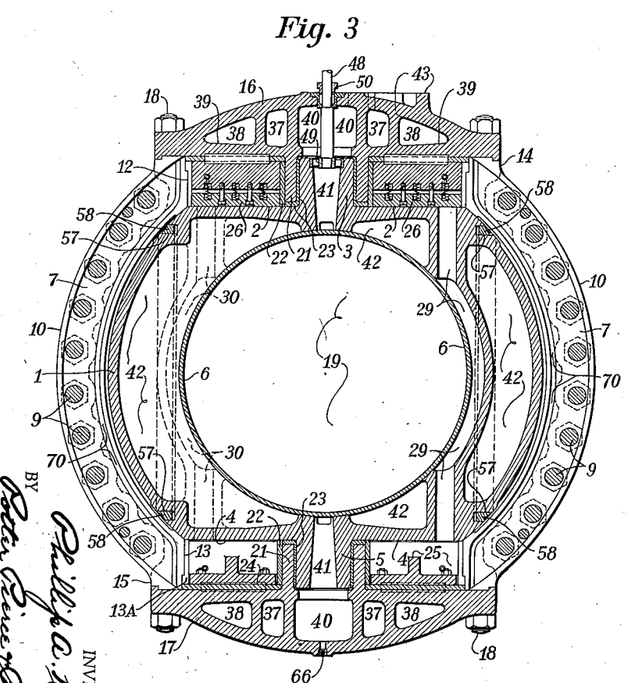
Fig. 3 is a transverse vertical section through the valve in the wide open position taken upon the line 3—3 of Fig. 2.

The valve body castings 7 and 8 are provided with a horizontally disposed waterway 19, Figs. 1, 2, 3 and 4, whose defining cylindrical walls 20 are concentric with the center of valve 1 and are consequently in level alinement with each other, and whenever the spherical valve element 1 is rotated to the wide open position, as shown in Figs. 1, 2 and 3, the cylindrical inner wall surface of the tubular liner 6 of the valve then registers with and forms continuity of surface with the cylindrical surfaces 20 which are then adjacent to its opposite extremities.

The upper domed head 16 and lower domed head 17, Figs. 1 and 3, are made essentially symmetrical and their opposing inwardly facing surfaces are formed as horizontal planes parallel with the polar planes 3 and 4 of spherical element 1 and these surfaces are covered with non-corrodible metal facings 24 smoothly machined on their exposed surfaces and from the central portion of each of these plane surfaces a tubular member 21 extends inwardly towards the center of the sphere 1 and concentric with the vertical axis thereof. The exterior and interior cylindrical surfaces of these tubular members 21 are finished to receive non-corrodible metal sleeves 22 on their exterior surfaces and non-corrodible metal bearing bushings 23 on their interior and on their inwardly projecting end surfaces. The interior cylindrical surfaces of these bearing bushings 23 are finish bored to provide an easy turning fit for the cylindrical trunnions 3 and 5 of the non-corrodible metal of the spherical valve element 1, which is thereby provided with a rotatable mounting on its vertical axis and is maintained from vertical displacement with respect to the centerline of the conduit and the valve body by the finished shouldered end faces of the bushings 23 contacting as thrust collars with the polar plane surfaces 2 and 4 of the valve element 1.

By the arrangement and interrelationship of the parts just described, the spherical valve element 1 is rotatably mounted within the valve body and two annular pressure chambers are formed, these chambers being concentric with the vertical axis of rotation of the valve element 1 and symmetrically disposed at equal distances above and below the horizontal centerline of the fluid conduit. These vertically alined pressure chambers are similar to rings of rectangular cross-section, their outer circumferential vertical walls being formed by the interior cylindrical surfaces of the cylinder bushings 12A, Fig. 1, their inner concentric vertical walls being formed by the external cylindrical surfaces of the sleeves 22. Their outwardly extending ring surfaces are defined by the facing rings 24 on upper domed head 16 and lower domed head 17, while their inwardly extending ring surfaces are defined by the annular ring face 2 constituting the north polar plane of the spherical valve element 1, and the similar annular ring face 4 which constitutes the south polar plane of the valve.

Figures 8, 9, 10, 11, 12, 13, 14, 15, 16, 17:
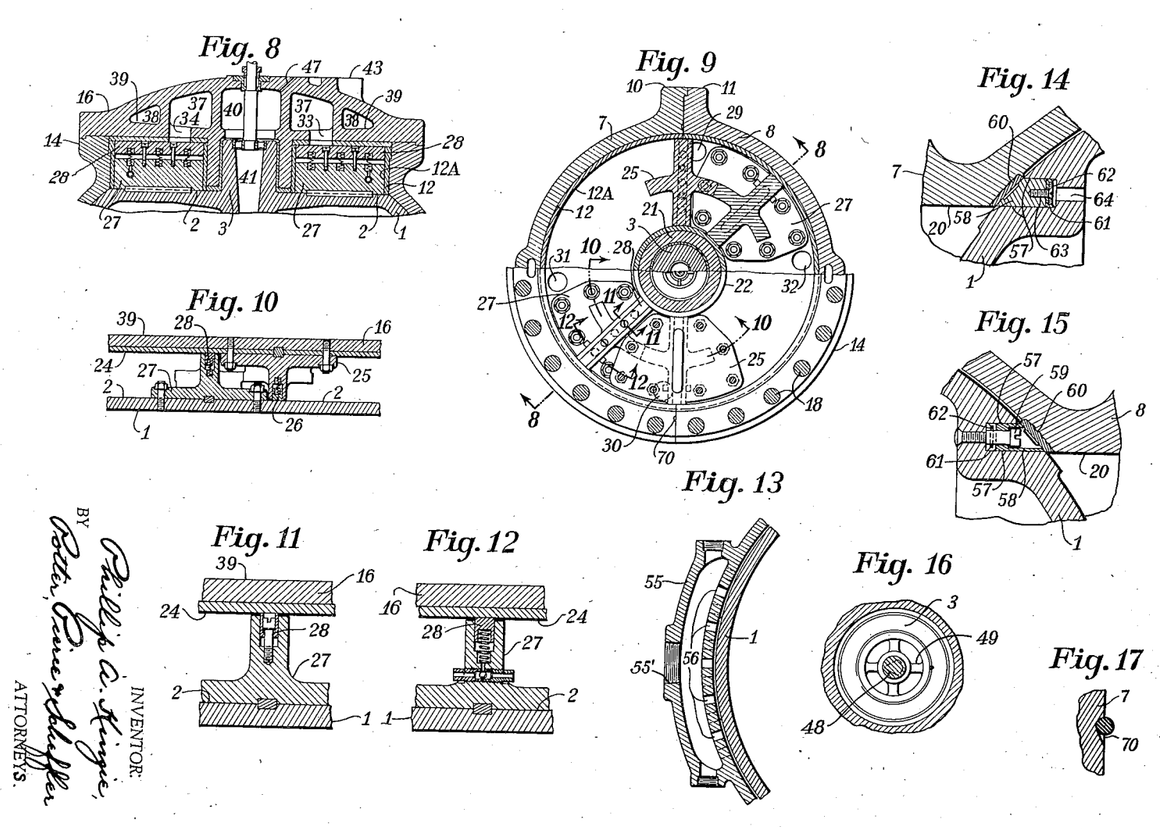
Fig. 8 is a vertical section taken upon the line 8—8 of Fig. 9 to show the upper portions of the valve element and valve body, the upper domed head and the rotor vanes attached to the upper polar plane area of the rotatable valve element.
Fig. 9 is a horizontal section through the upper hydraulic motor taken upon the line 9—9 of Fig. 1.
Fig. 10 is a vertical fragmentary section taken upon the arc 10—10 of Fig. 9 to show the relative positions of a rotor and a stator in the wide open position.
Fig. 11 is a vertical section through a rotor and its sealing mechanism taken upon the line 11—11 of Fig. 9.
Fig. 12 is a vertical section through a rotor taken upon the line 12—12 of Fig. 9 showing the sealing element, the spring engaging arrangement and the double acting ball check valve for admitting pressure beneath the sealing element.
Fig. 13 is a vertical section through the air inlet manifold, taken upon the line 13—13 of Fig. 2.
Fig. 14 is a detail section showing the seal ring with cooperating cupleather, retaining plate and screws.
Fig. 15 is a detail section showing the seal ring with cupleather, retaining plate and the seal ring guide screws.
Fig. 16 is a horizontal sectional view of the upper valve element trunnion and bearing taken upon the line 16—16 of Fig. 1, showing the "round end" triangular hole broached in the spider so that the indicator shaft must always be assembled therein in its correct position.
Fig. 17 is an enlarged fragmentary sectional view showing the groove formed in the vertical parting face of the valve body to receive a round rubber gasket for making this vertical joint fluid tight.

Boltedly attached to the under face 24 of upper domed head 16 and to the upper face 24 of lower domed head 17 are T-shaped stators 25, Figs. 3 and 10, which extend radially across the breadth of these annular pressure chambers, on diametrically opposite sides of the tubular hubs 21, as may be seen in Fig. 9, with their outwardly facing ends in fluid tight engagement with the outer circumferential vertical walls 12A and their inwardly facing ends in fluid tight engagement with the inner circumferential vertical walls 22, while their vertical legs extend into close proximity to the north polar ring surface 2 and south polar ring surface 4 which are sealingly engaged by the non-corrodible metal seal bars 26, Figs. 3 and 10, which are telescopingly mounted within the ends of the T legs and extend across the entire horizontal cross-sectional width of the annular pressure chambers between their outer walls 12A and their inner walls 22 and provide fluid tight sliding engagement between the stators and the polar surfaces 2 and 4, whereby the upper and lower annular pressure chambers are each divided into two equal and symmetrical pressure chambers.

Boltedly attached to the north polar face 2 and to the south polar face 4 in radial and diametrically opposite alignment are the T-shaped rotors 27, Figs. 8, 9, 11 and 12, which extend horizontally endwise across the cross-sectional breadths of the annular pressure chambers to provide sliding fluid tight engagement with their outer circumferential vertical walls 12A and their inner cylindrical vertical walls 22, while the vertical legs of these T-shaped rotors extend vertically into close proximity to the metal facings 24 of the upper domed head 16 and lower domed head 17 and in the extremities of these T legs are telescopingly mounted rectangular seal bars 28, Figs. 8, 9, 11 and 12, of non-corrodible metal which are forced outward into fluid tight sliding engagement with the surfaces 24, thereby in cooperation with their rotors still further dividing the upper and the lower annular pressure chambers each into four pressure chambers. The construction and functioning of these rectangular non-corrodible metal seal bars 26 and 28 is essentially the same as that which I have already described, illustrated and claimed in my copending application Serial No. 633,005, filed Sept. 13, 1932, "Rotor valves".

By the symmetrical arrangement of the parts heretofore described, the four pressure chambers beneath the upper domed head 16 are directly over and in vertical alinement with the four complementary pressure chambers located immediately above the lower domed head 17, and each of the four upper pressure chambers is placed in direct intercommunication with its complementary and vertically alined pressure chamber below by means of pressure port passages 29 and 30 (Figs. 2 and 3), and 31 and 32 (Figs. 1 and 2), all four of which pierce the metal of the north polar plane 2 and the south polar plane 4 and then continue as cored passageways through the interior of the spherical valve element 1, as may be seen in Fig. 3, traversing the space enclosed between the interior surface of the exterior shell of valve 1 and the exterior cylindrical wall surface of the tubular member 6 which encloses the waterway 19 through spherical valve element 1.

By inspection of Fig. 2, it will be seen that these intercommunicating pressure port passages are all arranged symmetrically in diametrically opposite pairs, wherein passages 29 and 30 constitute one pair and passages 31 and 32 make the other pair, and therefore intercommunication is provided between the pressure chambers above the horizontal centerline of the valve and the respective complementary and symmetrically positioned pressure chambers below that horizontal centerline.

From the foregoing it will now be evident that if pressure fluid be admitted into the pair of upper pressure chambers from which pressure port passages 29 and 30 extend downwards, then the equivalent vertically alined pair of lower pressure chambers will likewise be subjected to substantially equal pressure, due to those pressure port passages, and a turning torque in clockwise direction will be developed in substantially equal amount in the upper and the lower pairs of pressure chambers simultaneously, and the reactions so created between the stators 25 of the upper and lower domed heads 16, 17, and the rotors 27 which are bolted to the polar planes 2 and 4 of the spherical valve element 1 will impress rotary movement upon the valve element 1 in a clockwise direction and cause valve element 1 to turn to the closed position of the valve, this rotary movement so produced causing the fluid within the inactive pairs of chambers served by pressure port passages 31 and 32 to be expelled from the lower pair of pressure chambers through these port passages 31 and 32 into the complementary pair of upper pressure chambers and from thence through means that will be described hereinafter to the common exhaust or waste pipe.

It will now be obvious that if the procedure just described be reversed, and pressure fluid be introduced simultaneously into the upper pair of pressure chambers from which the pressure port passages 31 and 32 extend downwards to the complementary vertically alined pair of lower pressure chambers, then turning torque will be produced which will cause the spherical valve element 1 to rotate in a counterclockwise direction and opening of the valve will be effected, this being accompanied by the expulsion of fluid progressively from the inactive lower and upper pairs of pressure chambers interconnected by pressure port passages 29 and 30.

Figure 6:
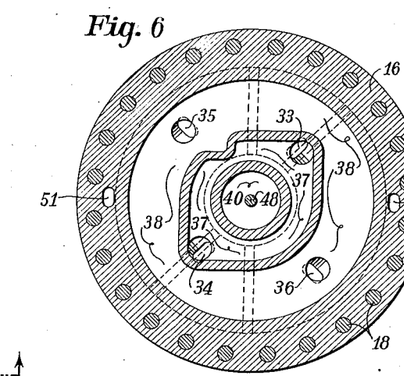
Fig. 6 is a horizontal section through the upper domed head of the valve, taken upon the line 6—6 of Fig. 1 to show the three concentrically disposed pressure distributing ports.
Figure 7:
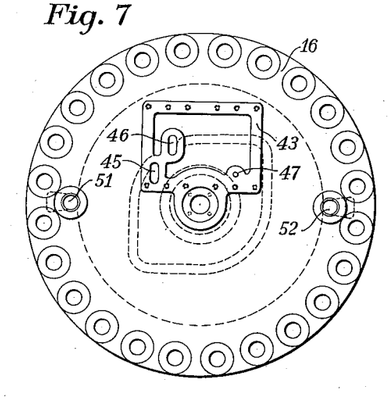
Fig. 7 is a plan view of the upper domed head with the control mechanism removed to disclose the finished pad for receiving same and the three ports piercing the top of the domed head to afford communication with the three concentric ports shown in Fig. 6.

The pressure fluid is simultaneously introduced into one or the other of the two upper pairs of pressure chambers by means of the domed head pressure ports 33 and 34, Figs. 6 and 8, which open into the closing chambers served by pressure port passages 29 and 30, and by domed head pressure ports 35 and 36, Fig. 6, which open into the opening chambers which are interconnected by pressure port passages 31 and 32. The ports 33 and 34 are interconnected within the interior of the domed head 16 by means of the horizontally disposed annular ring port 37, Figs. 1, 3, 4, 6 and 8, which as will be seen in Fig. 6, is provided with two diametrically opposite lobes or node-like extensions to encompass the zones within which the ports 33 and 34 are positioned. The ports 35 and 36 are similarly interconnected by a horizontally disposed annular ring port 38 whose inner vertical circumferential wall, as may be seen in Fig. 6, is common to annular ring port 37, and its outer circumferential boundary is defined by the interior downward facing domed surface of head 16 where it intersects with the upward facing surface 39, Fig. 8.

Concentric with the vertical axis of the valve there is provided in upper domed head 16 a cylindrical pressure port 40, Figs. 1, 3, 4, 6 and 8, whose vertical, circumferential defining wall is common to the interior boundary of the annular ring port 37, and this port 40 communicates with the alined cored port 41, Figs. 1, 3, 4 and 8, in upper trunnion 3 and continues therethrough to establish communication with the space 42 enclosed within the interior surface of the sphere. Pressure fluid introduced into the space 42 operates, as will be described later, to actuate the sealing members when the valve element has reached its fully closed position. It will be noted that the space between the liner tube 6 and the interior wall of the sphere 1 is of much greater size than is necessary for supplying pressure fluid to the sealing members and that, if desired, this space may be subdivided, by ribs on the inner wall of the sphere 1, to provide pressure fluid passages and additional passages through which steam or hot water may be circulated to prevent the valve from freezing in cold weather and/or to permit the successful handling of viscous fluids which might congeal or solidify at or near normal atmospheric temperature.

Figure 5:
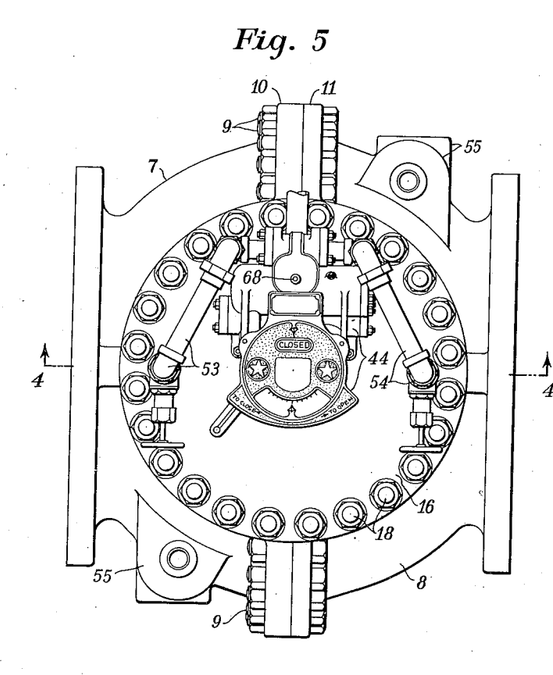
Fig. 5 is a plan view of the valve with the control mechanism in place thereon.

The lenticular space within the lower domed head 17 is subdivided into three similar and symmetrical ports 37, 38 and 40 in the same manner as has been described for the equivalent ports in upper domed head 16, and these ports are provided with small pipe taps 65, 66 and 67, Fig. 1, to which suitable drain cocks may be attached so that by opening said cocks and removing the small air vent plug 68, Fig. 5, in the top of control mechanism 44, all the interior cavities of the valve will drain out dry.

Upon the upper face of the domed head 16 a raised pad 43, Figs. 1, 3, 4, 7 and 8, is provided with its upper face machined to a level plane to boltingly receive in fluid tight engagement the control mechanism 44, Fig. 5. Through the surface of this pad there are provided three downwardly extending port openings 45, 46 and 47, Fig. 7, which communicate with annular ring ports 37, 38, and cylindrical pressure port 40, respectively. It is through the agency of these ports 45, 46 and 47 that the control mechanism 44 introduces pressure fluid and releases exhaust fluid from the actuating chambers to cause the desired functioning of the valve.

While the described arrangement of the pressure fluid passages within the valve element will usually be the preferred design, it will be apparent that the desired communication between the rotor chambers may be established by piping exterior to the valve body.

The control mechanism will not be described in detail in this present application as it is the intention to cover it specifically in a companion application. For present purposes, it will suffice to state that the mechanism includes suitably related valves and ports to control flow of pressure fluid to and from port openings 45 and 46 for rotating the valve element, and to port 47 to force the sealing rings into engagements with their cooperating seats. An indication of the spherical valve's position is shown on the dial of the control mechanism 44, Fig. 5, and the functioning of this dial is achieved by direct rotational movement of the control shaft 48, Figs. 1, 3 and 4, whose lower end is so shaped by flattening its sides as shown in Fig. 16, that it can only be inserted in the one correct position into spider 49 which is keyed fast to and turns with the upper trunnion 3.

Where the vertically extending control shaft 48 extends upwards through the top of the domed head 16, a stuffing box and gland 50 is provided to prevent leakage of pressure fluid from the port 40 below.

Figure 4:
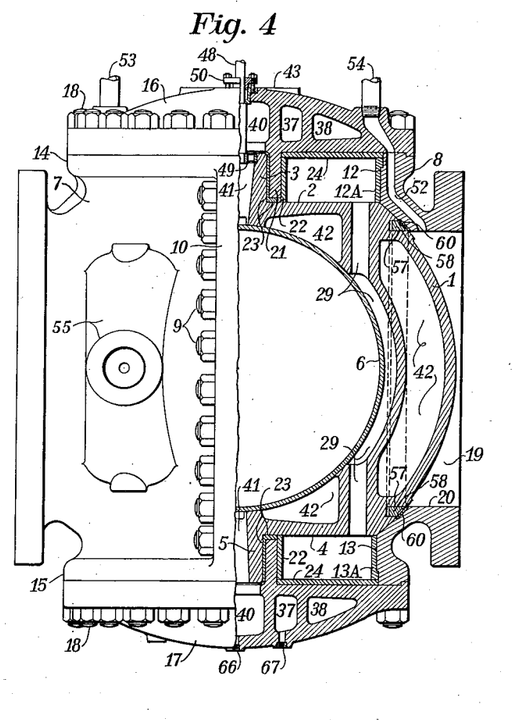
Fig. 4 consists of a half side elevation and a half longitudinal vertical section through the valve in the closed position taken upon the line 4—4 of Fig. 5.

In the valve illustrated herein power fluid is taken from within the conduit at opposite ends of the valve body through the pressure supply ports 51 and 52, Figs. 1, 4 and 6, which are cored in the valve body and extend upwards through domed head 16 to communicate with the valved pipes 53 and 54 which extend to the control mechanism 44.

Air inlet manifolds 55 and 56, Figs. 2, 4, 5 and 13, are cast integrally with body castings 7 and 8 and communicate with the interior of the valve bodies through the holes 56, Figs. 2 and 13, so that whenever the spherical valve element 1 is rotated so that it is in the partially open position and fluid under high velocity is passing therethrough in either direction, one or the other of these manifolds 54 or 55 will admit air into the zone where vacuum effects would otherwise be produced, as is fully described and claimed in my copending application Ser. No. 609,904, filed May 7, 1932, "Valves." The entrance of air into the manifolds through inlet ports 55' is controlled by automatic valves, not shown, which may be of the type described and claimed in my copending application Ser. No. 649,222, filed Dec. 23, 1932, "Automatic air vent and drainage systems."

Concentric with a horizontal centerline level with that of the valve body and the spherical valve element and passing through the vertical axis of rotation thereof at 90° from and consequently normal to that of the tubular member 6 (Figs. 2 and 4), there are provided two rectangular seal ring grooves 57 on opposite sides of the sphere, which are cut into its external surface as may be seen in Figs. 2, 4, 14 and 15. The inner diameters of these rectangular seal grooves are made substantially the same as that of the waterway 19, Fig. 4, in the valve body, and the outer diameter somewhat larger, and into each of these grooves a non-corrodible metal seal ring 58, Figs. 2, 3, 4, 14 and 15, is closely fitted to the inner and outer cylindrical wall surfaces of the receiving grooves 57 so that the rings 58 can be reciprocatingly extended from these grooves or telescoped into them in accordance with the progressive cycle of closing or opening of the valve.

In addition to these seal rings 58 being guided by their closely fitted external and internal cylindrical surfaces in sliding contact with the complementary adjacent walls of the grooves 57, they are also maintained in their proper axial alinement and restrained from over-extended outward travel from their groove mountings by the guide screws 59, Figs. 1 and 15, which are provided with cylindrical shouldered heads closely fitted into cooperating counterbores in seal rings 58 which are made about $\frac{1}{32}''$ deeper so that the seals may be extended beyond their grooves by a like amount. By reference to Fig. 15, this clearance between the bottom of the counterbore and the shoulder formed by the head of the screw may be seen, likewise the reduced threaded diameter of the screw which thereby forms a second shoulder which rests against the bottom surface of the groove 57, thus permitting these screws to all be made accurately to shouldered lengths and then be screwed in tightly against their threaded shoulders, which thereby locks them in place through the action of Dardelet type threads and at the same time insures that the shouldered heads of these screws will all be at the same precise distance from the bottom of grooves 57 to insure proper limitation of axial movement of the seal rings 58 to permit full engagement with the non-corrodible metal seats 60, Figs. 1, 2, 4, 14 and 15, which are welded or brazed into rough turned grooves in the valve body castings 7 and 8, and then finished to spherical seating faces, as are also the exposed sealing faces of the seal rings 58, which are then grooved circumferentially to cut away a portion of this spherical sealing surface as may be seen in Figs. 14 and 15.

To the inwardly turned square faces of seal rings 58 are attached double crimped cupleathers 61, Figs. 14 and 15, held in position by the metallic retaining rings 62 through the agency of the small screws 63, Fig. 14, which pass through parts 61, 62 and are threadedly received in the square faces of 58. The equal spacing of these screws around the mid-circumference of 58 may be seen in the dotted view in Fig. 1.

The outer circumferential crimp around the rims of the cupleathers 61 rest against the outer cylindrical walls of the grooves 57, while the inner circumferential crimp around the inner rims of the cupleathers 61 in like manner rest against the inner cylindrical walls of grooves 57, thereby sealing the annular ring space between the bottom of grooves 57 and the opposingly facing cupleathers 61 against outward leakage of pressure fluid through either the outer or the inner circumferential clearance spaces between the adjacent surfaces of 57 and 58.

This annular ring space behind the seal rings 58 as just described, is thus formed into a fluid pressure chamber, which when subjected to pressure will force the ring 58 axially outwards into tight engagement with the cooperating seat 60 as illustrated in Figs. 14 and 15. Pressure fluid is admitted to these annular ring chambers for forcing the seal rings 58 outward into engagement with the seats 60 by drilled holes 64, Figs. 1 and 14, through the bottom groove wall to communicate with the space 42 within the spherical valve element 1, so that whenever the control mechanism 44 admits pressure through port 47 into passage 40, and from thence into passage 41 and finally into space 42, as hereinbefore described, the pressure fluid enters the annular ring space behind the seal rings 58 through the drilled holes 64 and forces seal ring 58 into engagement with inlaid seats 60. This sealing and seating action will be effective on the outflow side of the valve; i. e., if the flow through the conduit and valve be from left to right, the sealing action will occur on the right hand side, and if the flow through the valve be from right to left, then the sealing action will accordingly be on the left (assuming that conduit pressure is employed to operate the valve). When higher pressures than those in the conduit are used to operate the valve, as is contemplated in certain instances, then both seals will become effective in their action.

Expressing the sealing action in different words, that seal ring 58 which is actuated to provide tight closure of the valve is on the low pressure side of the rotating spherical valve element 1, for it will have full conduit pressure behind it tending to force it into engagement while there will only be approximately near atmospheric pressure tending to resist its outward movement for engagement, for the outflow conduit side will then be under little, if any, pressure.

The action and operation of this sealing ring are based on the principle of a preponderance of force behind the inner face of the ring that is fitted with the doubly crimped cupleather packing, which face is normal to the horizontal centerline of the sphere and also to the centerline of fluid flow when the seal ring or rings are forced hydraulically outwards in a horizontal path of travel concentric with the centerline of fluid flow through the valve body, until its or their exposed spherically shaped end faces are brought into fluid tight sealing engagement with the cooperating seat or seats. This preponderance of operating and sealing force to bring the parts into fluid tight engagement is secured by either or both of the following means:

(1) Hydraulic pressure is effective over the entire annular ring area constituting the inner face of the ring seal with its doubly crimped cupleather packing, while the opposite and consequently exposed spherical face of the seal ring is relieved by the circumferential groove hereinbefore described which is in direct communication with the outflow conduit beyond the valve wherein little if any pressure is present, consequently only a small portion of the seal ring's face area lying around its outer circumference and outside of the circumferential relief groove is subjected to the same intensity of pressure acting in opposition to that which is effective upon its inner face.

(2) Pressure of a higher intensity and value to that prevalent within the conduit upon the inflow side of the valve and brought from an independent source of supply to the control mechanism through whose agency it is introduced into the annular ring pressure chamber behind each sealing ring to produce outwardly engaging force and movement of the seal ring or rings as hereinbefore described.

Whenever an independent source of pressure is employed as just described, the torsion motors will then be susceptible of operation for opening and closing the valve with the conduit dry, so that inspection and maintenance work can be carried on to great advantage in this manner and I so contemplate its use.

As best shown in Fig. 17, the face of the valve body casing 7 is provided with a circumferential groove 70 of tapering cross-section for receiving a round rubber gasket 70' that is deformed to provide a water-tight joint when the two body castings 7, 8 are drawn together by bolts 9.

As noted above, the interior wall of the sphere element 1 may be ribbed to provide additional passages for the circulation of a heating medium when such action is desirable to maintain viscous materials in a fluid state or when need arises to maintain the temperature of the valve above the freezing point. It is also possible, as illustrated in Figs. 18 to 21, to provide passages for a thermal medium, without substantially altering the design of any of the larger elements of the described valve.

Figures 18, 19, 20, 21:
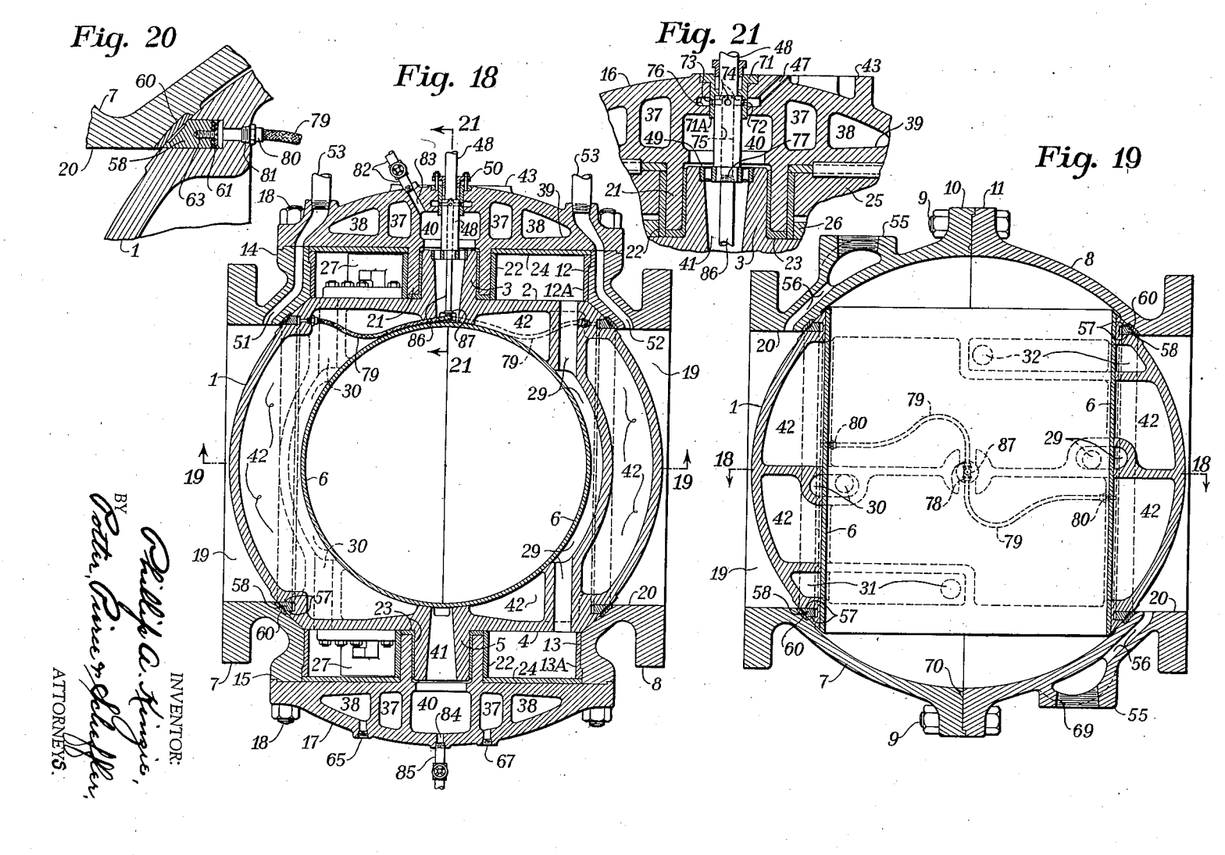
Fig. 18 is a vertical longitudinal section, as taken on line 18—18 of Fig. 19, through a valve including passages for receiving a heating medium.
Fig. 19 is a horizontal longitudinal section on line 19—19 of Fig. 18.
Fig. 20 is a detail sectional view of the seal ring and pressure fluid chamber for the same.
Fig. 21 is a fragmentary sectional view on line 21—21 of Fig. 18.

The general construction of this form of the invention is substantially the same as that previously described and corresponding parts are identified by like numerals. In Fig. 18 and in Fig. 21, it will be observed that the stuffing box 71 in upper domed head 16 is provided with a downwardly extending portion 71A which closely fits the enlarged portion of shaft 48 to provide a long percolation distance against leakage from or into the annular ring port 72 cut within its interior, which port is provided with radially drilled holes 73 which communicate with the annular port 76 formed in top domed head 16. In shaft 48, radially drilled cross holes 74 communicate with ring port 72 and intersect the vertically drilled hole 75, the lower end of which is the tapped end 77 of the downwardly extending pipe 86 whose lower end is likewise threaded to enter a dual outlet or tee 87. The ends of the tee are threaded to take hose connections 78 for the oppositely extending flexible metallic hoses 79 whose ends terminate in the hose connections 80 which are threadably received in tapped holes 81, Fig. 20, which establish communication with the annular pressure chamber behind each of the seal rings 58. Pressure fluid from the control mechanism thus enters the domed head through port 47 and is delivered to the annular pressure chambers behind the two seal rings 58 without affecting the space 42 within the sphere.

With this arrangement, steam under suitable pressure is admitted through the upper steam inlet 82, Fig. 18, through the drilled port 83 in upper domed head 16, and enters cylindrical cavity 40 from which it descends through the openings in spider 49, Fig. 21, through cored port 41 in upper trunnion 3, Fig. 18, and from thence into the cavity 42 whose large radiating surfaces serve admirably in the transfer of heat to the fluid passage 19. As the steam condenses it passes on downwards through the lower cored port 41 through lower trunnion 5 and into cylindrical port 40 in lower domed head 17 from which it is drained away through the lower steam outlet 84 and into the lower steam outlet pipe 885 below.

In valves of very large size, instead of using the space 42 within the sphere as a thermal cavity, it will instead be filled with water through 84 and 85 under conduit pressure, or higher if desired, from an outside connection to equalize the structural stresses within the sphere when it is subjected to external pressure, and in so doing the principle will be employed that was used in those curled paper tubes with mouthpiece attached which were sold at fairs and carnivals some years back, and which when filled with a sudden, lusty breath, uncurled with disconcerting speed and became straight and surprisingly rigid. By introducing water under pressure into the cavity 42 as described, the spherical valve element and its stems will be given increased strength and stiffness in similar manner. This will be most advantageous in valves of 14 feet to 20 feet in diameter or more.

To those who are skilled in the art, it will be obvious that while I have herein given a specific description and illustration of one particular valve, quite wide departures may be made from the construction and interrelationship of its parts without departing from the spirit of my invention.

I claim:

1. In a valve, a rotatable valve element having the form of a surface of revolution and having a cylindrical passage therethrough, a valve casing having a central cavity conforming to said surface of revolution and in which said valve element is positioned for rotation about an axis normal to the axis of said passage, said casing having conduit passages in axial alinement with said valve element passage when said valve element is rotated into fully open position, and hydraulic motors at diametrically opposed portions of said valve element for rotating the same, said motors each including a plurality of diametrically opposed pressure chambers for impressing upon said valve element a substantially pure torque free from unbalanced components exerted along or normal to the rotational axis of said valve element, said valve element being of approximately spherical form with portions at the opposite sides thereof cut away to provide like annular plane surfaces normal to the rotational axis of the valve element, the inner edges of said annular surfaces being defined by cylindrical stems, and said casing including a body portion having cylindrical walls concentric with the rotational axis of said valve element, and domed cover plates secured to said body portion and having cylindrical bearings for said stems of the valve element; said hydraulic motors being formed by radial vanes secured respectively to said plane surfaces of said valve element and said domes to divide the annular space between said cylindrical bearings and the cylindrical walls of said body portion into a plurality of pressure chambers.

2. In a valve, a rotatable element having a cylindrical passage therethrough, the outer boundaries of said element being defined by an approximately spherical surface and the polar regions of said spherical valve element being cut back to provide annular surfaces normal to the rotational axis and central stems projecting from said annular surfaces, a valve casing having a central cavity conforming substantially to the central spherical surface of said element and having annular surfaces in alinement with and spaced from the annular surfaces of said valve element, and vanes secured to the respective opposed annular surfaces of said valve element and valve casing to constitute a pair of hydraulic motors at opposite sides of said valve element for rotating the same.

3. A valve as claimed in claim 2, wherein the vanes of said pair of motors are alined in planes passing through the rotational axis of said valve element, and pressure fluid passages provide communication between the axially alined pressure fluid cavities formed between adjacent vanes of the respective motors.

4. A valve as claimed in claim 2, wherein the vanes of said pair of motors are alined in planes passing through the rotational axis of said valve element, and pressure fluid passages within said valve element provide communication between the axially alined pressure fluid cavities formed between adjacent vanes of the respective motors.

5. A valve as claimed in claim 2, wherein said valve casing comprises a pair of substantially identical body sections meeting in a plane passing through the rotational axis of said valve element and normal to the passage in the same, and cover plates secured to said body sections and having plane inner surfaces opposed to the said annular surfaces of said valve element.

6. A valve comprising a casing, and a rotatable valve element within said casing; said valve element comprising a shell having an outer surface conforming to a surface of revolution, and a liner within said shell and having end faces lying in the said outer surface of revolution of said valve element, wherein said casing includes hollow domed heads having pressure fluid passages within the same, in combination with a pair of balanced hydraulic motors for rotating said valve elements, and means providing pressure fluid ports affording communication between corresponding pressure chambers of the respective motors.

7. In a valve, a casing having a spherical interior with opposite cylindrical openings therein, a valve element of spherical form fitted within said casing and having a cylindrical passage therethrough and opening and closing the openings in the casing, means journaling the spherical element at right angles to the axis of the cylindrical passage and on an axis of said spherical element, sealing means on said element between the casing interior and the spherical element and wholly within the spherical area, a fluid operated motor at each end of the journaling axis, and having fluid pressure chambers, and means for admitting and relieving pressure within corresponding chambers of the opposite motors including passages within the spherical valve element exteriorly of the cylindrical passage.

PHILLIP A. KINZIE.